United States Patent

[11] 3,587,385

| [72] | Inventor | Friedrich Orend |
| | | Bad Gandersheim, Germany |
| [21] | Appl. No. | 771,587 |
| [22] | Filed | Oct. 29, 1968 |
| [45] | Patented | June 28, 1971 |
| [73] | Assignee | Voith Getriebe KG, |
| | | Heidenheim (Brenz) Germany |
| [32] | Priority | Nov. 9, 1967 |
| [33] | | Germany |
| [31] | | P1627130.0 |

[54] CUTTER HEAD
8 Claims, 4 Drawing Figs.

[52] U.S. Cl. .................................................. 90/11, 90/9, 77/61
[51] Int. Cl. .................................................. B23f 21/12
[50] Field of Search .......................................... 90/9, 3, 11; 77/61; 29/(Inquired)

[56] References Cited
UNITED STATES PATENTS

| 1,540,826 | 6/1925 | Watts | 77/61 |
| 1,852,601 | 4/1932 | Boyer | 90/11 |
| 2,263,788 | 11/1941 | Schroder | 77/61 |
| 3,383,988 | 5/1968 | Grueninger | 90/11 |

*Primary Examiner*—Gil Weidenfeld
*Attorney*—Walter Becker

ABSTRACT: A cutter head which includes rotatable carrier means, cutting blade means carried by and at least approximately radially displaceable in said carrier means, and means operatively connected to said cutting blade means and operable in response to a substantially uniform rotation of said carrier means about its axis of rotation to bring about a movement of said cutting blade means relative to said carrier means.

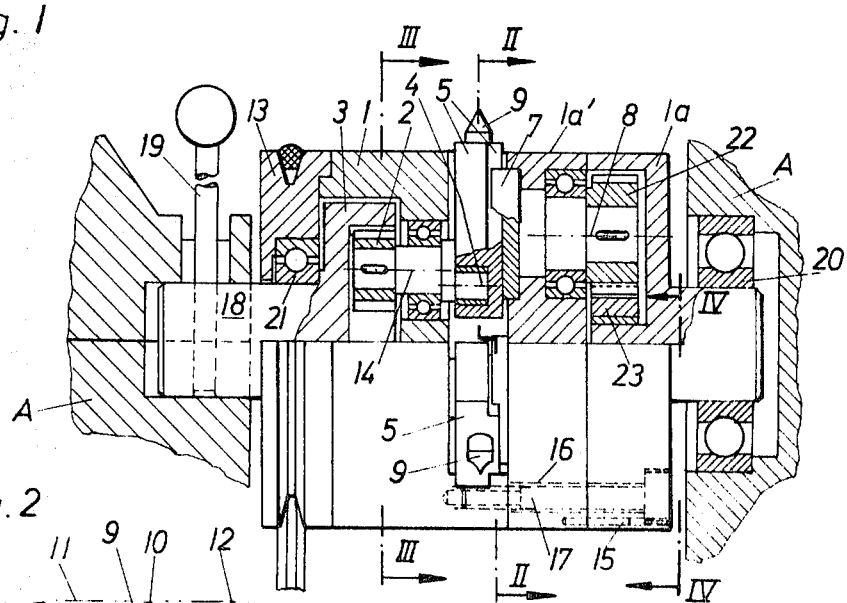
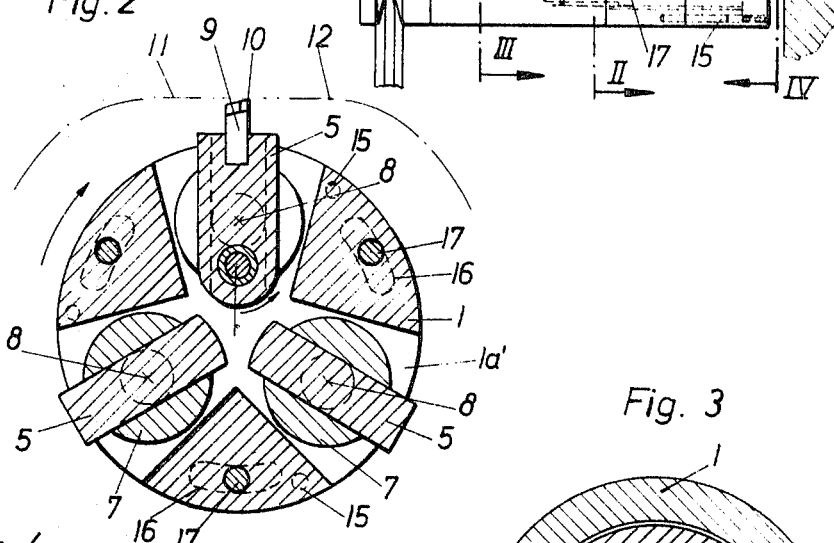
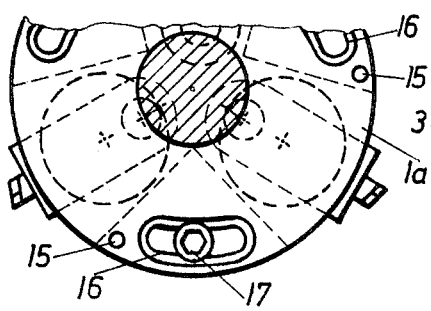
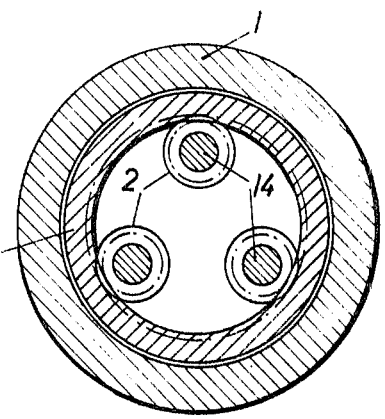

CUTTER HEAD

The present invention concerns a cutter head, preferably with the cutters uniformly distributed over the circumference, for a chip removing machining of workpieces. The presently generally customary chip removing methods for producing gears are based either on the principle of pushing or on the principle of milling. The pushing method has the drawback that the tool moves in alternate directions and that in connection therewith considerable forces in the driving mechanism occur as well as mass moments which are not equalized and which particularly at high cutting speeds cause difficulties. Furthermore, the idling movement of the tool during the return movement represents a certain time loss. With the milling method, however, only a low specific cutting output can be realized because the feed is dependent on the permissible magnitude of the polygons formed by the circular movement of the cutter and its feed. The comma chip which forms during the milling operation is with the vertical position of the cutting edge relative to the workpiece practically zero which means that the tool cutting edge for a short section of the cutting stroke slides over the workpiece whereby wear and a high heat development will occur at the cutting edge. In addition thereto, the volume of the removed metal is relatively low with regard to its geometrical form.

It is, therefore, an object of the present invention to provide a cutter head which will overcome the above-mentioned drawbacks.

It is another object of this invention to provide a cutter head which will combine the advantages of the pushing and the milling principles without having the disadvantages thereof.

These and other objects and advantages of the invention will appear more clearly from the following specification in connection with the accompanying drawing, in which:

FIG. 1 is an axial section through a cutter head according to the invention with three blades.

FIG. 2 is a section taken along the line II–II of FIG. 1.

FIG. 3 is a section along the line III–III of FIG. 1.

FIG. 4 is a fragmentary view of the connection between two members.

The cutter head according to the present invention which is preferably provided with a plurality of blades uniformly distributed over the circumference is characterized primarily in that the blades are radially or approximately radially displaceably mounted in the blade carrier and are provided with an adjusting mechanism which is so designed that the blades during a uniform rotation of the blade carrier about its axis will carry out a relative movement with regard to the blade carrier.

According to a further development of the present invention, the adjusting mechanism for the blades is so designed that in view of the rotary movement about the axis of the cutter head and in view of the additional movement for each blade over a portion of the rotary movement as controlled by the adjusting mechanism, at least an approximate tangential movement will be obtained.

The additional movement of the blades may also be obtained by rotatably journaling in the blade carrier for each blade a gear which is rotatable about an axis parallel to the axis of the blade carrier while the said gear in the manner of a planetary gear meshes with a stationary inner gear ring which is coaxial with regard to the blade carrier. Furthermore, each blade or holding means therefor is linked to the pertaining planetary gear by means of a crankpin, in other words, by means of a pivot located on an axis parallel to and outside the axis of the planetary gear, and on the other hand is rotatably guided in a slot or the like provided in the cutter head.

A cutter head designed in the above outlined manner brings about that the relative movement of the blade edges over a portion of the path of movement thereof becomes a straight or approximately straight movement. Consequently, the blades carry out a pushing movement with regard to the workpiece while on the other hand the blades, similar to a milling head, one after another will be continuously guided into the occurring gap so that practically no idling stroke will occur as is the case with the normal pushing operation. The chip being formed has a substantially constant cross section over the entire width of the gap in contrast to the customary milling operation, for instance with the indexing or dividing method or with the generating principle for producing gears. Moreover, in this way the heat load of the cutting edges becomes greater than during the milling operations although the volume removed per time unit is greater.

A further advantage of a cutter head according to the invention consists in that in view of its particular operation, the maximum cutting speed permissible for the respective material and occurring during the cutting operation amounts only to a fraction of the speed of the blades outside the engagement with the workpiece. In other words, with a cutter head according to the present invention it is possible to operate at considerably higher rotational speeds of the cutter head without exceeding the permissible cutting speed.

The invention may furthermore be developed by adjusting the cutting plane of the blades at any desired angle with regard to the chucking plane. To this end it will suffice with the design of the adjusting mechanism for the blades as described above to rotatably arrange the inner gear ring which is stationary during the operation so that the latter can be turned by a certain angle, and to adjust said angle by a corresponding rotation when the cutter is at a standstill.

It is further possible in a simple manner additionally to obtain a change in the angular position with regard to the cutting plane or to realize a change in the rake angle by making the rotatable shaft of the rotatably journaled slot displaceable in circumferential direction. The thus obtained rake angle change of the blades will with a given angle of mesh of the blades determine a changed angle of mesh of the chipped gap.

The invention is suitable in particular for an advantageous manufacture of gears with straight or inclined teeth by employing the generating method. In view of the rectilinear pushing movement, the involutes of the flanks are produced in small cuts of the tools with a rack profile which can be produced in a simple manner and can easily be reground. The individual correction of the flank shape may be realized by means of a controlled adjustment of the point of rotation of the slot structure.

Referring now to the drawings in detail, the cutter head illustrated therein comprises two drum-shaped members, namely the blade carrier 1 and the supplemental member 1a, 1a' rotatable in the frame A. These two members are coaxially interconnected but when at a standstill are adjustable circumferentially with regard to each other as shown diagrammatically in FIG. 4, an arcuate, elongated hole is formed in each of the triangular webs between the coulisses 7 which passes through the two parts 1a and 1a'. Screws 17 are passed through these elongated holes and threadedly engage a threaded blind hole in part 1 and secure the parts 1a and 1a' in the adjusted circumferential position. The two parts are fixed relative to each other by fitting pins 15 received in recesses in these parts. Rotatably journaled in the blade carrier is a plurality of gears 2 corresponding in number to the number of blades and having their axes parallel to the axis of the cutter head. These gears 2 are uniformly distributed about the circumference of the cutter head. As will be seen from the drawing, the gears 2 mesh with the inner teeth of a gear 3 which is stationarily arranged on stem 18, which is clamped in the divided bore of main frame A. The gear may be angularly adjusted by loosening the clamping sections of the frame and moving the gear circumferentially by a lever 19 fixed to stem 18. This movement of gear 3 circumferentially adjusts the position of the straight line movement (line 11, 12) of the blades 9. The pivot 14 of the gears 2 has connected thereto an axis-parallel crankpin 4 on which the holding means 5 for each blade 9 is rotatably journaled. Moreover, the holding means 5 is guided in a guiding path 7 which is rotatably journaled in the supplemental member 1a and in its turn is rotatable about the axis-parallel pivot 8. The cutter head is mounted for rotation on bearings 20 on the frame A and bearings 21 on the stationary stem 18, the gears 2 and crankpin 4 rotating with rotation of the cutter head. In view of the rotational movement of the crankpin 4, the blade holding means 5 will during the rotation of the cutter head be displaced in radial direction while simultaneously carrying out a pendulum movement about the pivot 8. The blade 9 is adjustable in a customary manner in the blade holding means 5 and is exchangeably clamped fast. The drive of the cutter head is effected by means of the V-belt pulley 13 flanged to the blade carrier 1.

The transmission ratio of the gears 2 and 3 meshing with each other and the ratio of the radii of the crankpin 4 with regard to the point of rotation of the gear 2 in the blade carrier 1 are so selected that the center of the crankpin 4 over a portion of the hypercycloide being formed moves along a straight line. The blade holding means 5 is received by the crankpin 4 and in the point of rotation by the guiding path 7 in such a way that the path of the blade edge 10 will within the range of the gap to be chipped form a tangent with regard to the circular path of the blade carrier 1. The drawing illustrates the tangential path of the blade edge from point 11 during a corresponding turning movement of the cutter head in the direction of the arrow to the point 12 while the chip and the front clearance angle of the blade remains constant.

By turning the normally stationary gear 3 with its inner teeth by a certain angle, the cutting plane of the blades may be moved into any desired angular position with regard to the chucking plane of the workpiece.

By turning the supplemental member 1a relative to the blade carrier 1 as provided by adjustable connection 16, 17, it is furthermore possible to obtain a change in the angular position with regard to the cutting plane or to obtain a change in the chipping angle. This change in the chipping angle of the blades requires a change in the angle of attack of the chipped gap with a given meshing angle of the blades.

According to a nonillustrated embodiment of the invention, the cutter head is designed in the form of a hollow ring in which the blades are so arranged that they point inwardly. With this embodiment of the invention, according to which the cutter head orbits about a stationary or rotating workpiece, the invention is particularly suited for producing polygon shafts on a turning lathe. Instead of operating with a hypercycloide, it is also possible to operate with a perycycloide of an epicycloide.

It is, of course, to be understood that the present invention is not limited to the specific construction shown in the drawing but also comprises modifications within the scope of the appended claims.

I claim:

1. A cutter head which includes: rotatable carrier means, cutting blade means carried by and at least approximately radially displaceable in said carrier means, drive means operatively connected to said cutting blade means and operable in response to a substantially uniform rotation of said carrier means about its axis of rotation to bring about said approximately radially displaceable movement of said cutting blade means in said carrier means, said cutting blade means comprising a plurality of cutting blades substantially uniformly distributed over the circumference of said cutter head, said drive means including a plurality of gears corresponding in number to and respectively associated with said cutting blades, each of said gears being rotatable about an axis substantially parallel to the axis of rotation of said cutter head, gear ring means with inner teeth common to and in mesh with said gears, said gear ring means being substantially coaxial with said carrier means and being adapted to be held stationary while said carrier means is rotated, a plurality of crankpin means corresponding in number to the number of cutting blades and respectively operatively connecting said blades to the pertaining gears, and guiding means rotatably journaled in said carrier means for guiding said blades in the approximately radially displaceable movement in said carrier means.

2. A cutter head according to claim 1, in which said gear ring means is adjustable by rotation about its axis for adjusting the cutting plane of said cutting blade means with regard to the workpiece to be machined.

3. A cutter head according to claim 1, in which said guiding means is adjustable in circumferential direction on said cutter head.

4. A cutter head according to claim 1, which includes an auxiliary member arranged substantially coaxially with said carrier means and having said guiding means journaled therein, said auxiliary member being circumferentially adjustable relative to said carrier means.

5. A cutter head according to claim 1, in which said carrier means is formed by an annular member while the cutting blade means extend into the interior thereof and said crankpin means in cooperation with the rotary movement of said carrier means imparts upon said blade means at least an approximately tangential movement with regard to said carrier means.

6. A cutter head according to claim 1, in which said crankpin means in cooperation with the rotary movement of said carrier means imparts upon said blade means at least an approximately tangential movement with regard to said carrier means.

7. A cutter head comprising carrier means rotatable about a main central axis of said cutter head, a plurality of cutting blade means distributed equally about the periphery of said carrier means, guide means for each of said cutting blade means pivoted on an axis spaced from and parallel to said main central axis, an internally toothed ring gear coaxial of said main central axis and fixed on said machine frame, means to move each of said cutting blade means outwardly and inwardly of said carrier means perpendicular to the axis of its guide means comprising a shaft spaced from and parallel to said central axis, pinion means on said shaft engaging said ring gear, and connecting means between said shaft and said cutting blade means to reciprocate said cutting blade means inwardly and outwardly as said carrier means rotates relatively to said ring gear.

8. A cutter head according to claim 7, in which said gear ring means is adjustable by rotation about its axis.